2 Sheets—Sheet 1.

W. WINKLESS.

FIRE ESCAPE.

No. 9,790. Reissued July 5, 1881.

Witnesses:

Wm. H. H. Knight

Fred F. Church.

Inventor:

William Winkless

By E. F. Ellsworth.

His attorney

N. PETERS, Photo-Lithographer, Washington, D. C.

W. WINKLESS.

FIRE ESCAPE.

No. 9,790. Reissued July 5, 1881.

Attest:
Geo. T. Smallwood Jr.
Harry E. Knight

Inventor:
William Winkless.
By Knight Bros
Attys

N. PETERS, Photo-Lithographer, Washington, D. C.

UNITED STATES PATENT OFFICE.

WILLIAM WINKLESS, OF NEWPORT, KENTUCKY.

FIRE-ESCAPE.

SPECIFICATION forming part of Reissued Letters Patent No. 9,790, dated July 5, 1881.

Original No. 197,709, dated November 27, 1877. Application for reissue filed December 9, 1880.

*To all whom it may concern:*

Be it known that I, WILLIAM WINKLESS, of Newport, Campbell county, State of Kentucky, have invented an Improvement in Fire-Escapes, of which the following is a specification.

My invention relates to that class of fire-escapes which let down escaping appliances from the roof, windows, or other elevated positions.

My invention consists, first, of an escape embracing in its construction two elevated independent winches, each of which carries a guiding-cable, a cage for passengers moving on said cables under the action of a controlling-rope, and other independent winches, in the lowest position to each of which one of the guiding-cables is attached, so that the tension of each guiding-cable may be separately adjusted; second, in providing the cage with idler-pulleys, over which the cables pass in a circuitous direction, and combining a lever with the cables adapted to operate thereon for instantly changing their tension to govern the descent of the cage; third, in so constructing the cover of the upper winches that it may be used as a platform or approach to the cage when the latter is held off from the building by the extended hinged crane-arms; fourth, in the provision, in connection with the upper winches, of an extensible platform, for the convenience of escaping passengers when extended and for covering the winch mechanism when closed up; fifth, in a peculiar device acting in conjunction with the winches for tightening the guiding-cables.

Figures 1, 2:
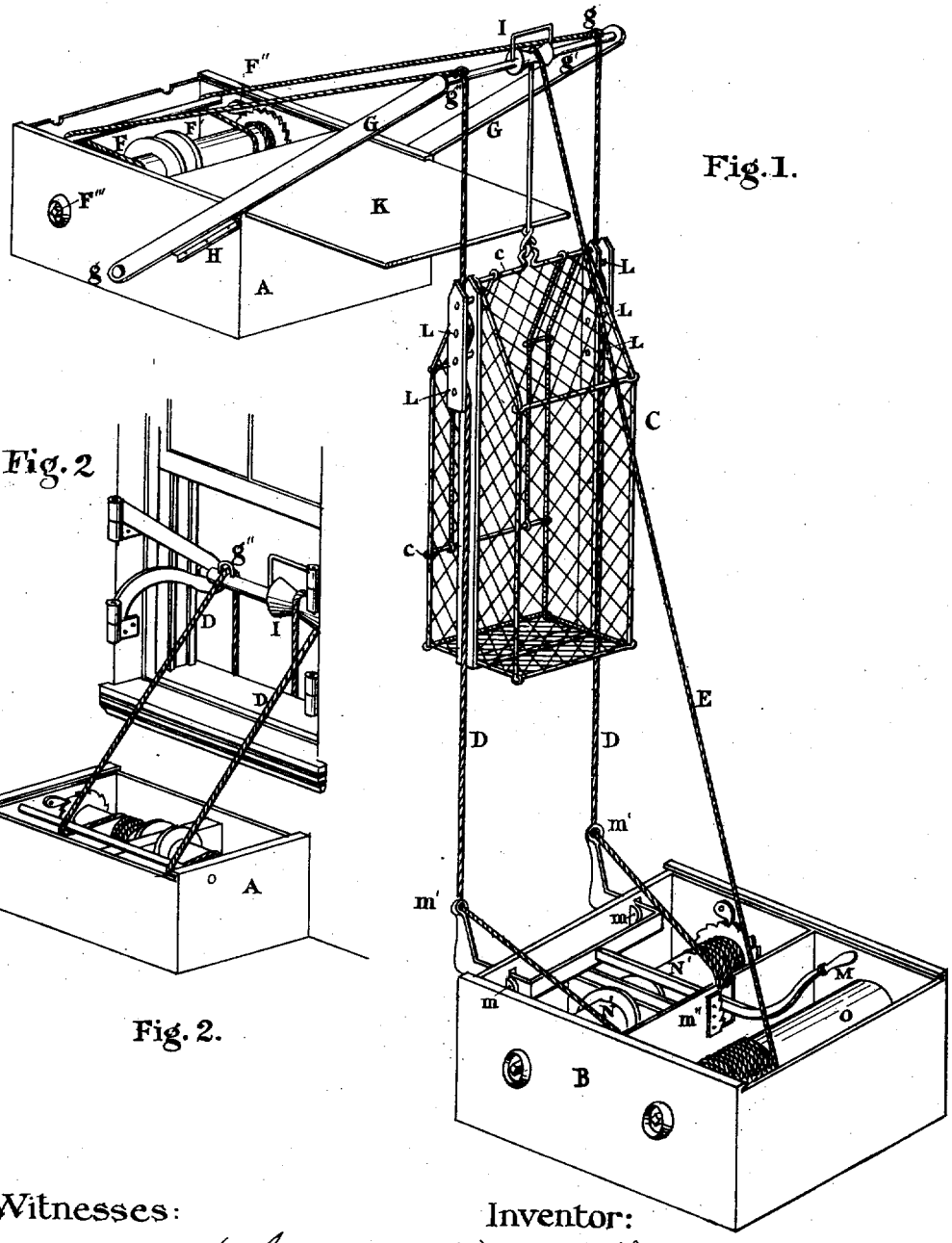
Figure 3:
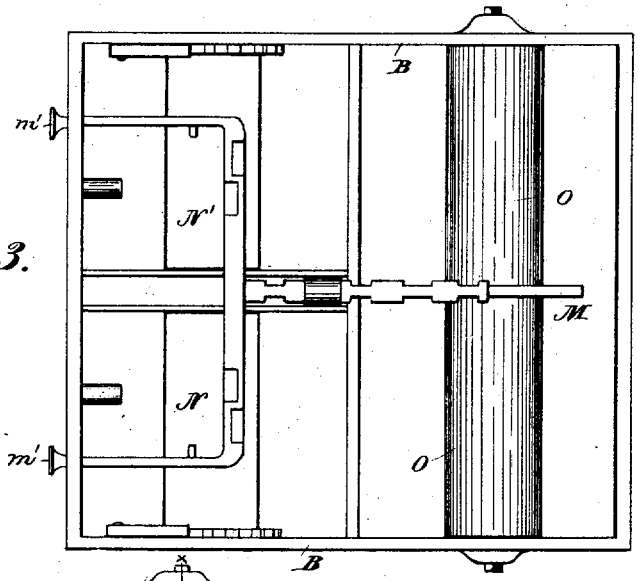
Figure 4:
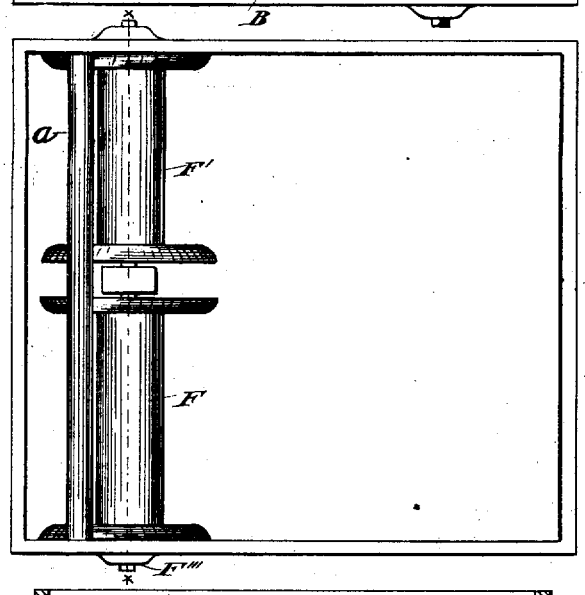
Figure 5:
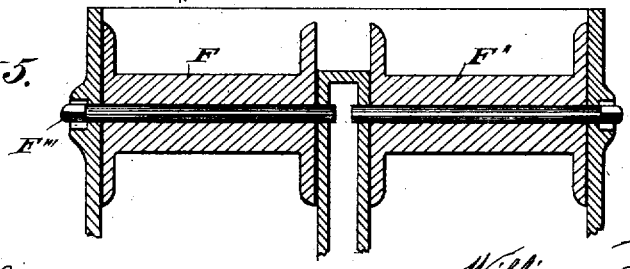

In the accompanying drawings, Figure 1 is a perspective view of my apparatus. Fig. 2 is a perspective room-interior view, showing its adaptation for operation at a window. Fig. 3 is a plan view of winch-box B, showing the independent winches N and N′. Figs. 4 and 5 show the same facts of construction and operation in winches F and F′ in winch-box A.

Referring to the drawings, A is the upper winch-box, serving as a support for winches F and F′ and for crane-arms G G′, over which rope E passes.

B is the lower winch-box, serving to support winches N and N′, the drum O, and lever M. C is the passenger-cab, and D D are the guiding-cables.

The winches may be permanent structures or portable, the cables being adapted to be drawn up by the upper winches and boxed up when not required for use. The cage and rope E of same, by which it is raised and lowered, may be kept in any convenient place for immediate use. The upper winches, F and F′, each carry a guiding-cable, and may each be turned to loosen the cable by lifting its pawl F″, and be turned in reverse to tighten its cable by use of hand-crank on its independent shaft F‴.

G G′ are crane-arms, hinged to the winch-box at *g*, and connected by a stationary axle, *g′*, on which the idler-pulley I turns, the axle having eyes *g″* for the guidance of the cables. When extended, as shown, the crane rests on the battens H for support, and, owing to the hinges, are adapted to fold back out of sight and use.

An extensible platform, K, moves in ways on the top of the winch-box, and when extended serves as a platform from which passengers step into the escape-cab, the latter having an opening, *c*, to permit them to enter. When closed up the platform is a cover for the winch mechanism.

When a cage is undesirable the ways or cables D D may be joined at intervals by cross-ropes, so as to form a ladder, the winches serving to give it the required tension.

To regulate the descent of the cage or cab, I journal in its frame, on each side, idler-pulleys L, and pass the guiding-cables in the circuitous route around them, as shown, so that the upper or lower winch or any tightening device for the cables may cause the cables to partially support the cage by kinking of the said cables at the idlers, and thus render the descent of the cage governable. When the descent is too rapid and beyond the control of the rope E, the appropriate winches may tighten the cables, so as brake the descending cage; or they may be tightened by the special lever M, which is more expeditious in operation. It is pivoted at *m m*, and carries eyes *m′*, through which the cables pass anglewise, as shown; and a rack, *m″*, holds the lever in any position into which the operator forces it. The flexibility of the lever allows it to be disengaged from the rack for return.

The winches N N′ in the lower winch-box are like the winches F F′ in the upper one, and, in addition to these, a single drum, O, may be used to operate the suspension-rope E. The cables pass preferably over the bar *a* in leaving the winch-box A. The lower winches may be anchored in the street at any point, so as to give a curve to the guiding-cables, or so as to work them vertically.

Having thus described my invention, what I claim is—

1. The combination of two separately-adjustable guiding-cables with a traveling cage, cab, or equivalent carriage, substantially as described, for the purpose specified.

2. The combination of two separately-adjustable guiding-cables with a cage or cab and an operating-rope, substantially as described, for the purpose specified.

3. The combination of upper and lower winches, A B, guiding-cables D D, cage C, and suspension operating-rope E, substantially as and for the purpose specified.

4. The combination of upper and lower winches, A B, guiding-cables D D, cage C, having idlers L for kinking said cables, and suspension operating-rope E, substantially as specified.

5. In combination, the winch A and its cover K, adapted to serve as a platform, hinged crane-arms G G′, and cage C.

6. In combination with the winch A, ropes D D, and cage C, the extensible platform K, operating substantially as and for the purpose specified.

7. In combination with the winch-frame B and cables D D, the lever M, substantially as and for the purpose specified.

The above specification of my invention signed by me this 23d day of October, A. D. 1880.

WM. WINKLESS.

Witnesses:
E. A. ELLSWORTH,
JAS. J. MUIR.